United States Patent
Simon et al.

(10) Patent No.: US 7,327,888 B2
(45) Date of Patent: *Feb. 5, 2008

(54) GEOMETRIC HASHING METHOD FOR MODEL-BASED RECOGNITION OF AN OBJECT

(75) Inventors: Christian Simon, Laval (CA); Djamel Meddah, Montreal (CA)

(73) Assignee: Matrox Electronic Systems, Ltd., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/347,083

(22) Filed: Feb. 3, 2006

(65) Prior Publication Data
US 2006/0126943 A1     Jun. 15, 2006

Related U.S. Application Data

(63) Continuation of application No. 09/978,000, filed on Oct. 17, 2001, now Pat. No. 7,027,651.

(60) Provisional application No. 60/295,583, filed on Jun. 5, 2001.

(30) Foreign Application Priority Data
Jul. 27, 2001  (CA)  .................................. 2354301

(51) Int. Cl.
*G06K 9/62* (2006.01)
*G06K 9/46* (2006.01)
(52) U.S. Cl. ...................... 382/217; 382/209
(58) Field of Classification Search ............... 382/181, 382/201, 209, 217, 218
See application file for complete search history.

(56) References Cited

U.S. PATENT DOCUMENTS

| 4,712,248 | A | * | 12/1987 | Hongo | ........................ 382/199 |
| 4,731,860 | A | * | 3/1988 | Wahl | ........................... 382/281 |
| 5,123,057 | A | * | 6/1992 | Verly et al. | .................. 382/156 |
| 5,953,451 | A | * | 9/1999 | Syeda-Mahmood | ......... 382/187 |
| 6,275,613 | B1 | * | 8/2001 | Aiger | .......................... 382/195 |

(Continued)

OTHER PUBLICATIONS

Hong et al. "An Improved Model-Based Matching Method Using Footprints," 9th Int'l Conference on Pattern Recognition, vol. 1, Nov. 14, 1988, pp. 72-78.*

(Continued)

*Primary Examiner*—Colin LaRose
(74) *Attorney, Agent, or Firm*—Lowrie, Lando & Anastasi, LLP (57) ABSTRACT

A method of pattern matching for recognition of objects within an image, uses a model defined by a set of one or more model primitives representative of large scale structures of an archetype. The image is analyzed to derive at least one target primitive representative of a large scale structure of the image. A basis is derived from at least one of the target primitives, and each of the target primitives represented as invariants in the derived basis. For each target primitive, any model primitives that at least partially match the target primitive are identified. Each identified model primitive is then processed to calculate a figure of merit indicative of a degree of correspondence between the target primitive and the model primitive. In some embodiments, the figure of merit is an Orthogonal projection between the target and model primitives, which is and accumulated for each model basis.

7 Claims, 9 Drawing Sheets

U.S. PATENT DOCUMENTS 6,466,695 B1 * 10/2002 Potzsch et al. ............. 382/199
6,735,343 B2 * 5/2004 Michael ...................... 382/241

OTHER PUBLICATIONS

Tsai. "Robust Affine Invariant Matching with Application to Line Features," Proc. IEEE Computer Society Conf. on Computer Vision and Pattern Recognition, Jun. 15, 1993, pp. 393-399.*

Liu et al. "Geometric Hashing with Attributed Features," Proc. 2nd CAD-Based Workshop, Feb. 8, 1994, pp. 9-16.*

Baek et al. "Occluded Object Recognition Using Extended Local Features and Hashing," IEEE Int'l Conference on Systems, Man, and Cybernetics, "Humans and Information Technology," vol. 3, Oct. 2, 1994, pp. 2367-2372.*

Au et al. "Affine Invariant Recognition of 2D Occluded Objects Using Geometric Hashing and Distance Transformation," Proc. IEEE TENCON, vol. 1, Nov. 26, 1996, pp. 64-67.*

Procter et al. "ForeSight: Fast Object Recognition Using Geometric Hashing with Edge-Triple Features," Proc. Int'l Conference on Image Processing, vol. 1, Oct. 26, 1997, pp. 889-892.*

Wolfson et al. "Geometric Hashin: An Overview," IEEE Computational Science and Engineering, vol. 4, No. 4, Oct. 1997, pp. 10-21.*

Tsai. "A Probabilistic Approach to Geometric Hashing Using Line Features," Technical Report No. 640, Robotics Research Laboratory, Courant Institute of Mathematical Sciences, Jun. 1993.*

Lamdan et al. "Geometric Hashing: A Generalized and Efficient Model-Based Recognition Scheme," Second Int'l Conference on Computer Vision, Dec. 1988, pp. 238-249.*

Canny. "A Computational Approach to Edge Detection," IEEE Trans. on PAMI, vol. 8, No. 6, 1986, pp. 679-698.*

Lamdan et al. "Affine Invariant Model-Based Object Recognition," IEEE Trans. on Robotics and Automation, vol. 6, No. 5, Oct. 1990.*

Lamdan et al. "On the Error Analysis of Geometric Hashing," Proc. IEEE Conference, Computer Vision and Pattern Recogntion, 1991, pp. 22-27.*

Grimson et al. "On the Sensitivity of Geomtric Hashing," Technical Report A.I. Memo 1250, Artificial Intelligence Laboratory, MIT, 1990.*

Rosin et al. "Nonparametric Segmentation of Curves into Various Representations," IEEE Trans. on PAMI, vol. 17, No. 12, 1995, pp. 1140-1153.*

* cited by examiner

GEOMETRIC HASHING METHOD FOR MODEL-BASED RECOGNITION OF AN OBJECT

RELATED APPLICATIONS

This application claims priority under 35 U.S.C. § 119(e) to U.S. Provisional Application Ser. No. 60/295,583, entitled "Fast method to find candidates of an object in an image," filed on Jun. 5, 2001, which is herein incorporated by reference in its entirety.

This application claims the benefit under 35 U.S.C. § 120 of U.S. application Ser. No. 09/978,000, entitled "GEOMETRIC HASHING METHOD FOR MODEL-BASED RECOGNITION OF AN OBJECT" filed on Oct. 17, 2001, now U.S. Pat. No. 7,027,651, which is herein incorporated by reference in its entirety.

Foreign priority benefits are claimed under 35 U.S.C. § 119(a)-(d) or 35 U.S.C. § 365(b) of Canadian application number 2,354,301, filed Jul. 27, 2001.

TECHNICAL FIELD

The present invention relates to machine vision, and in particular to a geometric hashing method usable by a machine vision system for model-based recognition of an object.

BACKGROUND OF INVENTION

Techniques of visual object (and/or pattern) recognition are increasingly important in automated manufacturing, biomedical engineering, cartography and many other fields. Model-based recognition techniques typically must solve the problem of finding, in an image acquired by a camera, an occurrence of a previously defined model that has been affected by affine transformation. Affine transformations may be defined as transformations in which straight lines remain straight and parallelism is preserved. Angles however, may undergo changes and differential scale changes may be introduced.

Geometric hashing, as described in "Geometric hashing: A generalized and Efficient Model-based Recognition Scheme" (Y. Lamdan and H. J. Wolfson, Second International Conference on Computer Vision, December 1988, pp 238-249), and "Affine Invariant Model-Based Object Recognition" (Y. Lamdan, J. T. Schwartz, H. J. Wolfson, IEEE Transactions on Robotics and Automation, Vol. 6, No. 5, October 1990) has been proposed as a method of finding occurrences between an image and a model with affine transformation and partial occlusion.

In known geometric hashing methods, models of objects are represented by interest points. These interest points are typically edge coordinates that correspond to important features (such as the ends of lines, corners, etc) of an object. For each triplet of interest points, a respective coordinate system is defined using the involved triplet as a basis. The location of each of the other interest points can then be calculated within the respective coordinate system, to produce a representation of the interest points that are affine invariant. For each coordinate system (basis), the calculated coordinates of each interest point is then used as an index to reference a corresponding bin of a hash table, into which a reference to the model and basis (e.g. a record in the form of [Model-ID, Basis-ID]) is inserted. The fully populated hash table is intended to provide a representation of the model that is invariant to affine transformation, and contains sufficient information to enable a match to be made, even when an object is partially occluded.

As is well known in the art, object recognition commences by acquiring an image of the object (e.g., using a gray-scale digital camera), and processing the image to detect points of interest. As with the model, each triplet of interest points is used as a basis for a respective coordinate system, within which the locations of each of other interest points are calculated. These calculated coordinates are used to access corresponding bins of the hash table. If an accessed bin contains a record (e.g. in the form of [Model-ID, Basis-ID]), then that record is accorded a vote. The records that accumulate the largest significant number of votes are adopted as candidates, and extracted for further analysis. The hypothesis is that the model referenced by the record with the highest number of votes most closely corresponds to the target image, and the proper transformation of that model into the target image can be computed from the basis identified in that record.

According to Lamdan and Wolfson ("Geometric hashing: A generalized and Efficient Model-based Recognition Scheme", supra), this geometric hashing technique can deal with partially occluded objects. However, in practice, geometric hashing often fails in cases where too many important features (e.g. corners, large edge features etc.) of a target object are occluded. This is because image detection and analysis generally yield a relatively small number of interest points that pertain to the object in question. Thus if too great a proportion of important features of the target object are occluded, the number of interest points detected for that object may be too low to permit the correct record to accumulate a significant number of votes.

In addition, noise in an acquired image can produce errors in the computation of the coordinates of interest points, which may result in incorrect coordinate values being used to access the hash table. The problem of imprecision and computation errors can affect both points which define bases, and interest points that are used to vote. Since interest point coordinate values are a function of the chosen basis, errors due to imprecision in respective basis point and interest point locations are accumulated. The problem here is that imprecision leads to too many false candidates being selected. In a real image, which normally contains both partial occlusions and noise, many "false" interest points are frequently found. Under some circumstances, these "false" interest points can cause a record to incorrectly accumulate a large number of votes. These problems are significant disadvantages of conventional geometric hashing, and are discussed in "On the Error Analysis of Geometric Hashing" (Lamdan, H. J. Wolfson, Proceedings IEEE Conference, Computer Vision and Pattern Recognition, pages 22-27, 1991) and "On the Sensitivity of Geometric Hashing" (W. E. Grimson, D. P. Huttenlocher, Technical Report A. I. Memo 1250, Artificial Intelligence Laboratory, Massachusetts Institute of Technology, 1990).

To avoid the above drawbacks, some improvements over traditional geometric hashing have been proposed. In particular, instead of interest points, the use of lines as affine-invariant features to represent an object has been suggested (See "A probabilistic Approach to Geometric Hashing using Line Features", Frank Chee-Da Tsai, Technical Report No. 640, Robotics Research Laboratory, Courant Institute of Mathematical Sciences, June 1993). In this technique, a line is represented as a vector $(r, \theta)$, where $r$ represents an orthogonal distance of the line from the origin of a selected coordinate system, and $\theta$ represents the angular orientation of the line in the coordinate system. This vector representation may also be extended to include the length of the line. According to Tsai, lines can be used as the basis of respective coordinate systems, and geometric hashing performed in a manner directly analogous to that used for interest points. The use of lines generally provides a more robust representation of an object, because imprecision in the location of detected points (e.g. due to noise) do not affect the location of a line as severely as they do when calculating coordinates of discrete points.

However, this technique can still result in records incorrectly accumulating a large number of votes. This is at least partially due to the fact that the vector representation provides information of the radial distance between the origin of a selected basis and an infinite-length line, and the angular orientation of the infinite length line relative to that basis. Even in cases where the vector notation is extended to include the length of a line-segment lying on the line, no information is provided about the actual position, along the infinite length line, of the line segment. While the approach of Tsai may yield improved recognition, in practice, it is still unable to reliably detect objects in respect of which a significant proportion of important features are occluded.

Accordingly, a robust geometric hashing method that enables rapid and reliable recognition of heavily occluded objects, remains highly desirable.

SUMMARY OF INVENTION

An object of the present invention is to provide a geometric hashing method that enables rapid and reliable recognition of heavily occluded objects.

Accordingly, an aspect of the present invention provides a method of pattern matching for model-based recognition of objects. Geometric features are detected within an image. These geometric features are then approximated using a plurality of primitives. A basis is derived from at least one of the primitives. Finally, each of the primitives are represented as invariants in the derived basis.

The geometric features may be obtained, in a manner known in the art, using either one of gray-scale and morphological processing of the image. In cases where gray-scale processing of the image is used, the detected geometric features may include coordinates of any one or more of: edge points; edge discontinuities; and line crests. In cases where morphological processing of the image is used, the detected geometric features may include coordinates of any one or more of: a skeleton mapped to the image; and a binarized contour.

A primitive may be a straight line segment, or a curve segment. Curve segment primitives may be represented by any of: elliptic, quadratic, cubic or spline functions. In any event, each primitive approximates at least a sub-set of the detected geometric features. Taken together, the plurality of primitives form a piece-wise approximation of the image.

In some embodiments, mapping a primitive through a sub-set of geometric features may be accomplished by finding a largest primitive that can be mapped through a respective plurality of geometric features consistent with a predetermined maximum error tolerance between the primitive and the involved geometric features. In addition, end-points of each primitive may be forced to lie on respective ones of the geometric features.

When two or more primitives are mapped along a continuous feature of the image (e.g., a continuously curved edge), adjacent primitives are preferably forced to intersect at respective adjoining end points. This ensures that continuity of the image feature is properly reflected in the primitives used to approximate that feature.

A basis is derived by calculating an origin of a respective local coordinate system, and then finding directions of respective axes of that local coordinate system. In a preferred embodiment, the coordinate system axes are orthogonal, in which case the direction of only one of the axes needs to be explicitly determined. In some cases, a plurality of bases are derived, and then a subset (i.e., at least one) of the derived bases are selected for use. This approach yields improved pattern matching speed, by reducing the number of bases that need to be derived and processed.

Pattern matching performance (primarily robustness to occlusion) can be further improved by using any one or more of the following rules in the selection of bases:
 select bases derived using relatively large primitives;
 select at most two bases derived using any one primitive;
 select bases having respective origins distributed substantially evenly across the detected geo features; and
 select bases in respect of which the orientation of the respective coordinate system is based on an orientation to at least one primitive used in the derivation of the respective basis.

Preferably, a basis origin is calculated from an intersection point of a pair of extrapolated primitives. In this respect, an "extrapolated primitive" is the result of extrapolating the mathematical model of the primitive beyond the end-points of the primitive. The simplest example involves simple straight line segment primitives. In this case, the corresponding "extrapolated primitive" is simply an infinite line coextensive with the primitive. In some cases, two or more intersection points can be calculated using respective pairs of primitives, and the origin determined as a centroid of the intersection points. This centroid may be a weighted centroid, in which each involved intersection point is weighted by the lengths of the primitives used to calculate that intersection point.

In some embodiments, the orientation of the respective local coordinate system is calculated by selecting one of the primitives used to calculate the origin, and calculating the orientation of the coordinate system based on an orientation of the selected primitive. Here again, the simplest example uses straight line-segment primitives, in which case the orientation of the coordinate system can be parallel to the selected primitive. Alternatively, an average orientation of the primitives used to calculate the origin may be used. In some cases, the orientation of each primitive (which may, for example, be represented as an angle) may be weighted by a length of that primitive.

In cases where the acquired image is an archetype image, the primitives may be used as so-called "model primitives", and used to populate a hash table with model data. As is well known in the art, a hash table typically provides a 2-D matrix of "bins". Each bin is adapted to store data relating to features appearing within a respective portion of an acquired image. Using this arrangement, the hash table may be populated by sampling each primitive with a predetermined granularity. This granularity may be selected on the basis of desired recognition accuracy and speed. Each sample location is then mapped to a respective "sample bin" of the hash table, and a reference to the respective primitive (and basis) inserted in that bin.

A respective error bar can be defined about each sample. This error bar preferably reflects an expected error tolerance in the location of detected local features relative to the primitive. Each error bar can then be mapped to corresponding "error bar bins" in the hash table, which will normally be adjacent to corresponding sample bins, and a reference to the respective primitive and basis inserted into each of the error bar bins. This arrangement ensures that, during pattern recognition, a primitive lying within the expected error tolerance will intersect one of the sample or error bar bins when mapped to the hash table.

In cases where the image is a target image, the primitives can be used as target primitives, and matched to model data previously stored in the hash table. This matching operation preferably includes, for each target primitive:

mapping respective end points of the target primitive to corresponding end-point bins of the hash table;

locating intermediate bins crossed by a line (or curve, as appropriate) extending between the end-point bins and tracing the shape of the primitive between the end-point bins;

searching each of the intermediate bins to identify model primitives referenced in any of the intermediate bins; and for each identified model primitive, calculating an orthogonal projection of the target primitive onto the model primitive.

In general, the orthogonal projection can be any measure of the degree of conformance between the target and model primitives. Conveniently, the orthogonal projection can be calculated as a length, measured along the model primitive, over which the target primitive lies within a predetermined error corridor about the model primitive. In this case, the error corridor can be selected based on an expected error tolerance in the location of detected geometric features relative to the target primitive.

In order to obtain an indication of the degree of conformance between the target image and the model data stored in the hash table, the orthogonal projection lengths calculated in respect of each model primitive can be accumulated. Since each model primitive is associated with a respective model basis, a respective sum of the orthogonal projection lengths calculated in respect of model primitives associated with each model basis can be calculated. A respective relative coverage indicative of a proportionality between the respective sum for each model basis and a predetermined total length of the model primitives can be calculated. The model basis having the highest relative coverage can then be selected as a candidate basis for further processing and verification of a match between the selected model (candidate) basis and the considered target basis.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing.

Further features and advantages of the present invention will become apparent from the following detailed description, taken in combination with the appended drawings, in which.

DETAILED DESCRIPTION OF THE
PREFERRED EMBODIMENT

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 1:
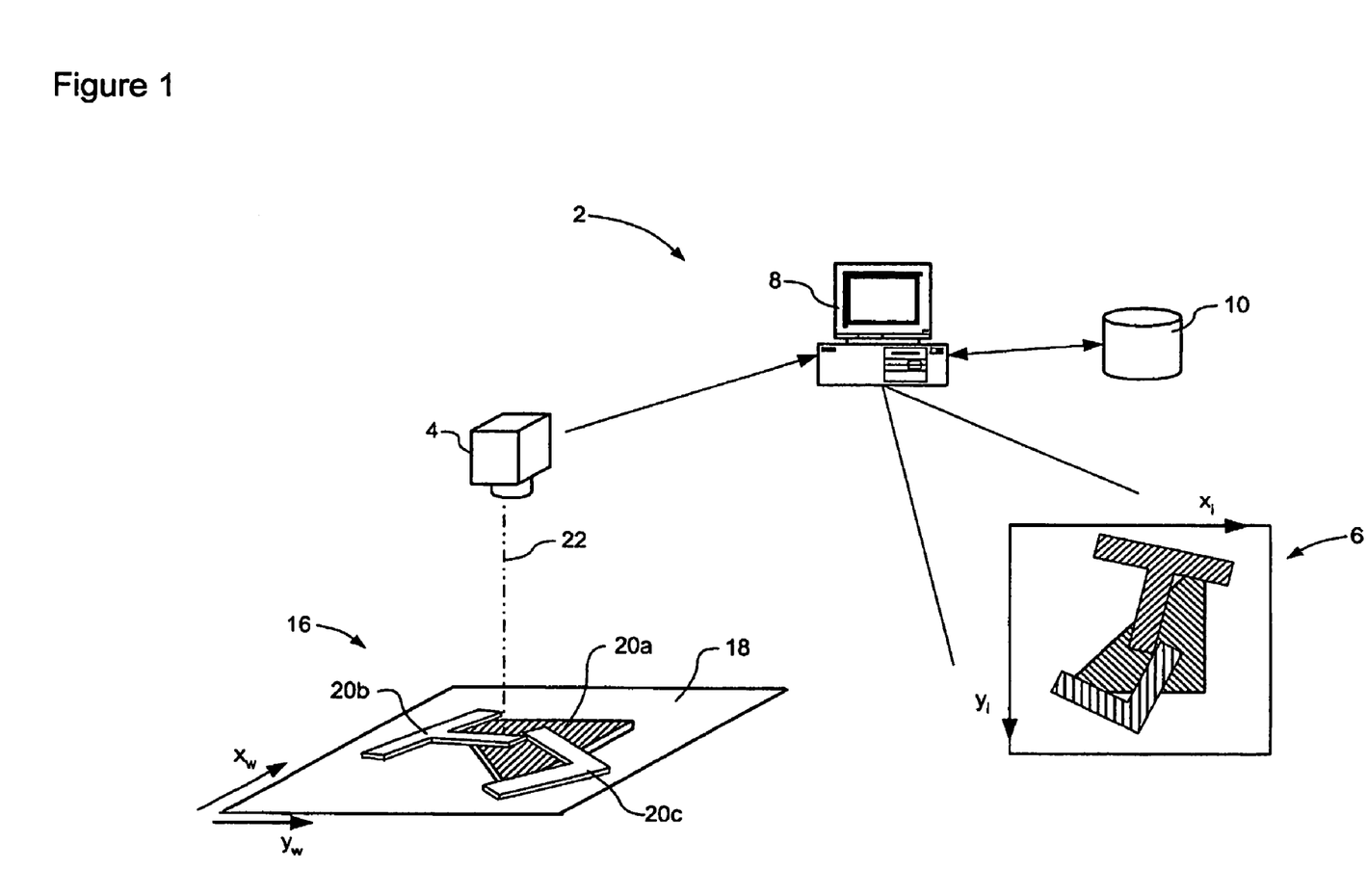
FIG. 1 is a block diagram schematically illustrating an exemplary machine vision system in which the present invention may be deployed.

The invention provides a robust geometric hashing technique for rapidly and reliably finding one or more occurrences of a model in an acquired image. FIG. 1 schematically illustrates an exemplary machine vision system in which the present invention may be deployed.

As shown in FIG. 1, the system 2 comprises an image acquisition device 4 for acquiring an image 6; an image processor 8 for analyzing the acquired image 6 (and, if desired, displaying the acquired image and/or any analysis results); and a database 10 containing model data respecting one or more models. The image processor 8 can be provided as any suitable combination of hardware and software, such as, for example, a suitably programmed computer. The database 10 may be stored within the processor 8, or, if desired, stored at a remote location and accessible by the processor 8 through a network (not shown), if desired.

The image acquisition device 4 (which may, for example, be a digital camera) is arranged to acquire an image of a desired field of view within a predetermined "world space" 16 of the system 2. This world space 16 may, for example, be defined within an inspection station (not shown) of a production line, in order to enable recognition and localization of objects passing through the inspection station. It will be appreciated that other types of image acquisition devices (e.g., electro-magnetic imaging devices such as radar and nuclear magnetic resonance imaging systems; or ultra-sonic imaging systems etc.) may be employed, as may be appropriate for the desired view. In any event, the world space 16 definition includes a "world surface" 18 (which may be a physical or a virtual surface) providing a visual reference frame.

In general, the system 2 operates to recognize objects 20 laying on (or approximately parallel to) the world surface 18, as viewed from the image acquisition device 4. In the embodiment of FIG. 1, the objects include a triangular object 20a which is partially occluded by an overlying circular object 20b. In general, a precise alignment between the world surface 18 and an object 20 to be recognized is not essential. Additionally, the world surface 18 can be suitably selected in accordance with the expected geometrical characteristics of objects 20 that are to be recognized. For the purposes of illustrating the present invention, in the embodiment illustrated in FIG. 1, the world surface 18 is a substantially planar rectangular surface lying within the world space 16.

The present invention provides a robust geometric hashing method for recognizing any number of occurrences of a predetermined model in the image acquired by the camera. The method of the present invention comprises two main phases, namely, model definition and pattern matching. Model definition involves calculation of model data in the form of a hash table. This hash table provides a representation of a model that is invariant to at least translation and the rotational orientation of the model in the image. The model data represented in the hash table may also be invariant to scale and/or affine transformations. Pattern recognition involves processing an acquired image to compare features of the image to the model data previously stored in the hash table. The results of this comparison can then be used to select a model as a candidate for an object located in the image. In the following paragraphs, model definition is described with reference to FIGS. 2 and 3a-3e. Pattern matching is then described with respect to FIGS. 4-6.

Model Definition

In general, model definition involves acquiring and analyzing an archetype to derive model data saved in a hash table. The archetype can be any image of the object to be recognized that has clearly distinct edges and no occlusion, in order to facilitate calculation of "good" model data. For example, the archetype may take the form of an image of an instance of the object acquired by the camera 4, and using suitable lighting and background to facilitate high-contrast and therefore clearly distinguishable edges. Alternatively, the archetype could take the form of a so-called "synthetic" description. Such a synthetic description may take any of a variety of forms, such as, for example, a line drawing produced using a computer aided drafting (CAD) software program; an associated drawing file output by the CAD program; or a set of one or more mathematical equations defining the shape of the archetype. In either case, the model data saved in the hash table provides a representation of the archetype that is invariant to at least rotation and translation. If desired, the model data may also be invariant to scale or other affine transformations of the model. Alternatively, separate hash tables may be used to save model data for each of a plurality of predetermined scale steps.

Figure 2:
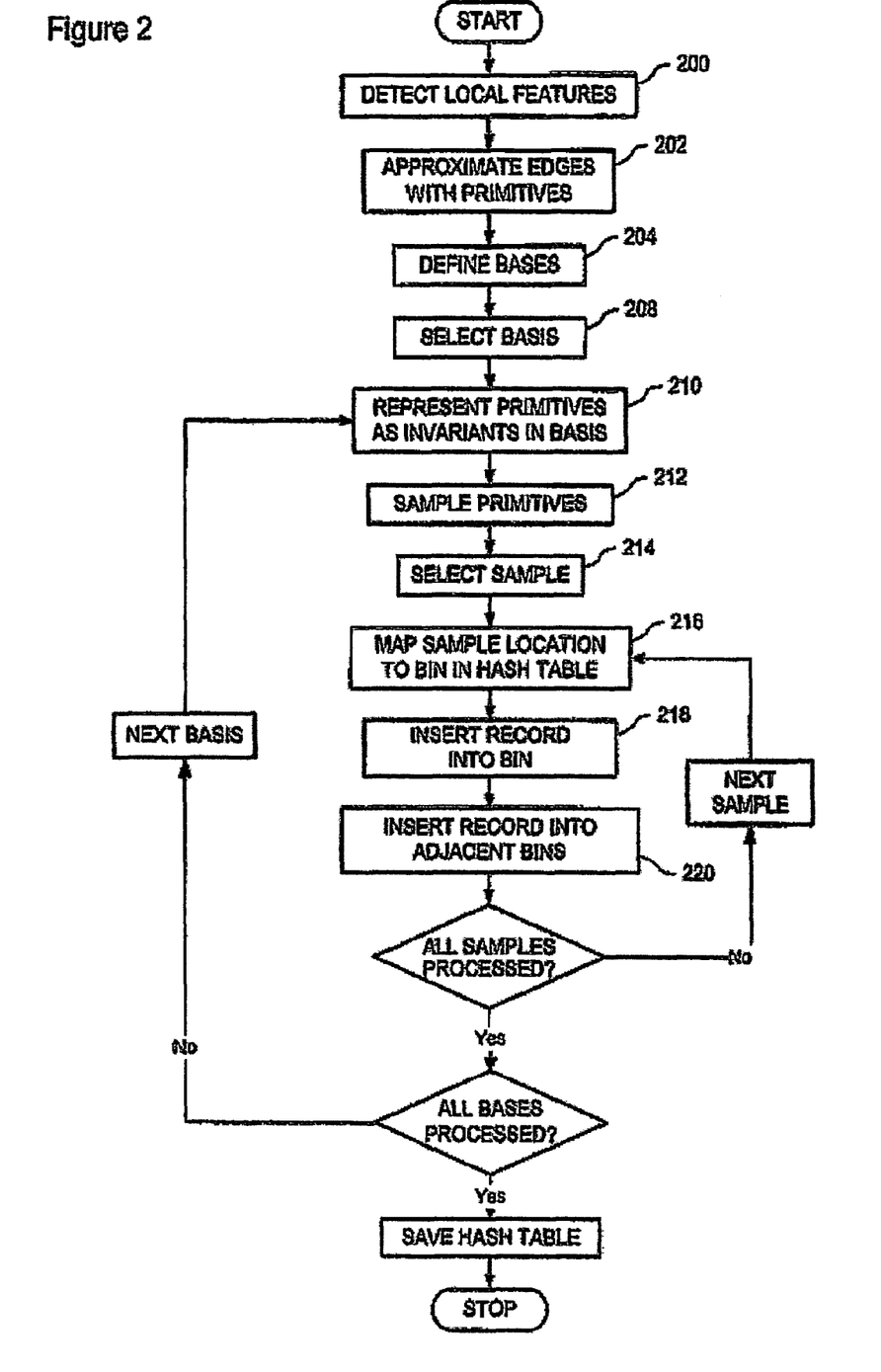
FIG. 2 is a flow chart illustrating principal steps in an exemplary process of preparing a hash table containing model data in accordance with an embodiment of the present invention.

Referring to FIGS. 2 and 3, model definition begins with acquisition of the archetype, which is then analyzed (at 202) to detect geometric features. FIG. 3a illustrates an exemplary archetype 24, which, for the purposes of example, is a high-contrast image of a triangular object placed on the world surfaced 18. The detected geometric features may be edge coordinates, points of interest or any other local features uniquely representing, as a set, the archetype. Edge coordinates can be isolated by any method known in the art, such as, for example, as described by J. F. Canny, ("A Computational Approach to Edge Detection", IEEE Trans. On PAMI, Vol. 8, No. 6, pp. 679-698, 1986). FIG. 3b shows an example of detected edge points 26 of the archetype 24. These edge coordinates can be processed to identify large scale structures (such as continuous edges) spanning multiple edge points.

The detected geometric features are then analyzed (at 204) to approximate edges using primitives 28. Large scale structures, such as continuous edges can be found using methods known in the art. See, for example, P. L Rosin and G. A. W. West, ("Nonparametric Segmentation of Curves into Various Representations", IEEE Transactions on Pattern Analysis and Machine Intelligence, Vol. 17, No. 12, pp. 1140-1153, 1995). In the example shown in FIG. 3c, each primitive 28 is a straight line-segment mapped through a sub-set of the edge points 26 forming a single continuous edge. It will be appreciated that other types of primitives (e.g., curve segments) could also be used.

Figure 3A:
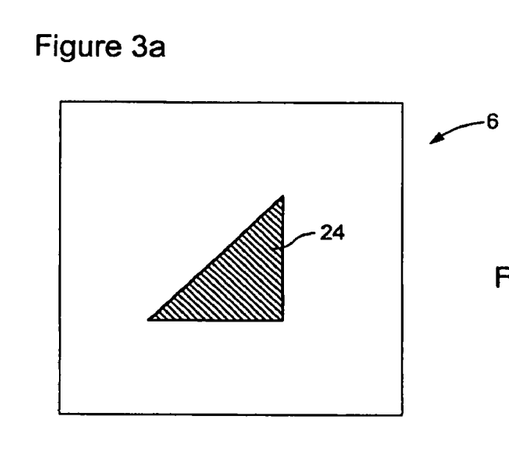
FIGS. 3a-3e sequentially illustrate successive steps in the process of FIG. 2.
Figure 3B:
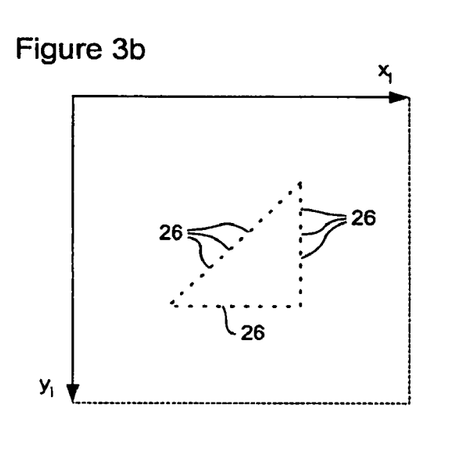
Figure 3C:
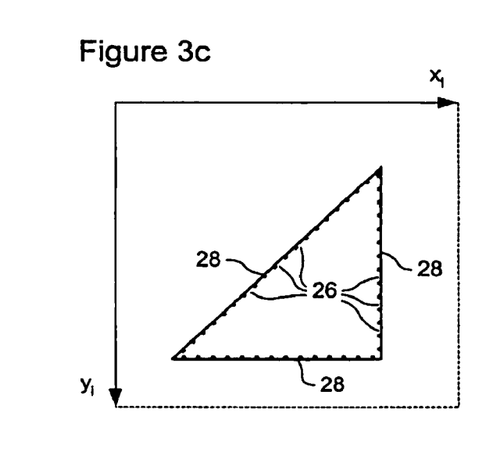

If desired, a "best fit" approximation of each edge may be used. However, this can result in loss of continuity information. For example, a set of straight line-segment primitives can be used to approximate a continuously curved edge. If each primitive is mapped through its respective sub-set of edge points using a "best-fit" approximation, then adjacent primitives will frequently not join at their end points, so that information respecting the continuity of the edge will be lost. Accordingly, it is preferable to use a "less than best fit" approximation, which sacrifices some accuracy in resolving the location (and/or shape) of an edge in order to ensure that information respecting edge continuity is preserved. For example, primitives can be mapped such that, for a continuous edge, adjacent primitives are forced to intersect at adjoining end points. If desired, the end points can also be forced to lie on the edge in question. In practice, the "less than best match" approximation can yield an acceptable approximation of curved edges (even using line-segment primitives) by suitably adjusting the length of the involved primitives so that the maximum error between each primitive and its associated edge points lies within a predetermined error tolerance. Preservation of continuity information improves recognition stability (and thus robustness to occlusion) by ensuring that relationships between groups of primitives accurately reflect features detected in the image.

Once the primitives 28 have been defined (at 204 above), one or more bases (in this case, each basis includes the origin and orientation of a respective local coordinate system) are defined (at 206). In order to improve recognition robustness, each basis is preferably calculated from a relationship between two or more primitives 28. For example, the origin of a basis may be calculated as: an intersection point between imaginary lines extending from two primitives 28; a centroid of two or more such intersections; or, preferably, a centroid of two or more such intersections weighted by the length at least one of the primitives 28 participating in each intersection. Similarly, the orientation of a basis may be calculated as: parallel to a primitive 28 near the origin; an average of the orientations of each of the primitives 28 used to calculate the origin; or a weighted average of the orientations of each of the primitives 28 used to calculate the origin, weighted by the lengths of each of the involved primitives 28.

In principle, it is possible to define at least as many bases as there are primitives 28. However, the efficiency (and thus speed) of pattern matching can be improved by using only a sub-set of the possible bases. In order to retain robust pattern recognition capabilities, bases are preferably selected according to one or more of the following rules:

use only highly "stable" bases (i.e., those associated with comparatively large primitives;

allow a maximum of two bases for any one primitive;

distribute basis origins as evenly as possible over entire object. This may include forcing a basis into a region of an image where object features are indistinct if other portions of the image have clear features favoring calculation of multiple bases; and select a basis orientation using primitives near its origin.

Figure 3D:
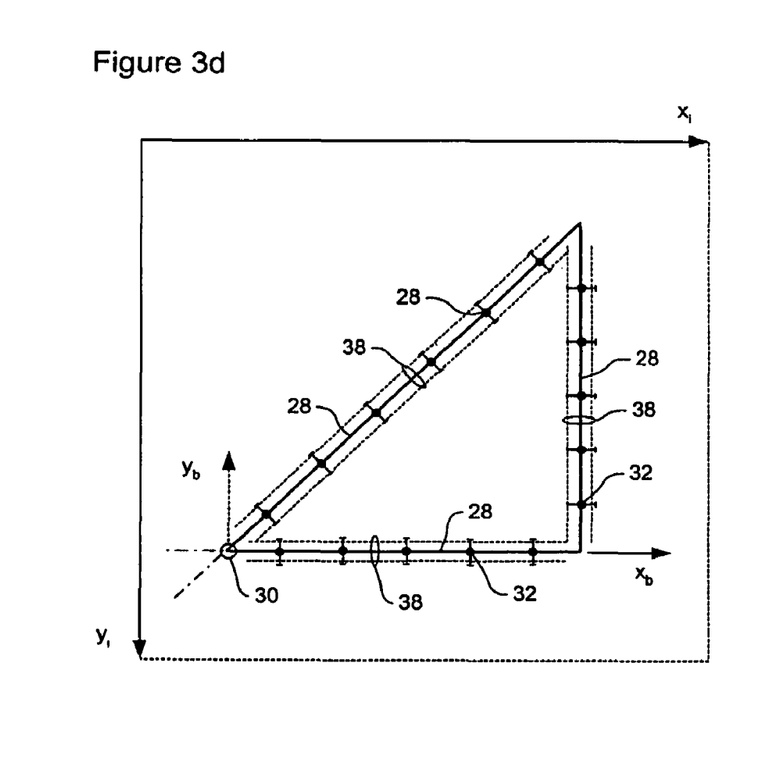
Figure 3E:
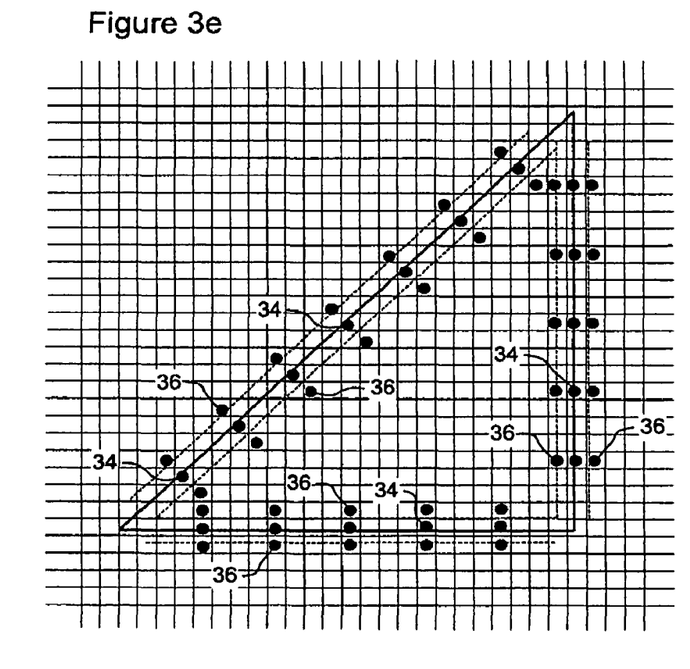

In the illustration of FIG. 3d, a basis is shown having an origin 30 located at an intersection point of two primitives 28, and oriented with one orthogonal axis (the $x_b$ axis) parallel to one of the primitives 28 used to calculate the origin 30.

Once the bases have been defined, one of the bases is selected (at 208), and the set of primitives represented as invariants in the local coordinate system of the selected basis (at 210). Representing the primitives as invariants renders the model data invariant to at least rotation and translation. If desired, dimensions can be normalized to render the model data scale-invariant. However, this increases the size of the hash table and complicates the problem of error tolerance. Accordingly, in preferred embodiments, dimensions are not normalized, and therefore absolute dimensions are mapped to the hash table. This renders the model data scale dependent. However, scale can be handled by any of a number of approaches including:

using multiple hash tables, that is, one hash table for each one of multiple predetermined scale steps;

scaling a target image (or target primitives) according to one or more predetermined scale steps, and then attempting to perform matching between the scaled image (primitives) and the hash table;

adjusting the size and/or number of error bars (described below) to guarantee that at least one scale step will result in a target primitive intersecting an error bar; or populating the hash table with references for model primitives in each of a plurality of scale steps, in which case each reference in the hash table is of the form (Basis_ID, Primitive_ID, Scale_ID).

The primitives (now represented as invariants) are then sampled (at 212) with an arbitrary granularity. The granularity chosen will normally be based on a balance between speed and robustness. In general, a finer granularity (i.e., more samples) requires more processing time but yields improved tolerance to occlusion. In FIG. 3d, locations of each sample are indicated at 32.

One of the samples is selected (at 214), and the coordinates of the selected sample (in the local coordinate system of the respective basis) mapped to an associated bin in a hash table (at 216), in a manner well known in the art. A record referencing the basis/primitive is then inserted (at 218) into the associated bin (indicated generally at 34 in FIG. 3e). In embodiments in which a single hash table is used to store data of a single respective scale step of one model, the record can take the form of a simple pair of identifiers (e.g., in the form of [Basis_ID, Primitive_ID]) that are respectively indicative of the basis and the primitive. It is not necessary to identify either the model or the scale in the record, as this information is implicitly tied to the respective hash table. However, in cases where multiple scale steps, and/or multiple models are stored within a single hash table, the record inserted into the associated bin 34 can be expanded as required to contain the appropriate identifying information.

The same record (e.g., [Basis_ID, Primitive_ID]) is also inserted into one or more adjacent bins (indicated generally at 36 in FIG. 3e) to create "error bars". The number adjacent bins 36 is used, and their orientation relative to the "main" bin 34 is selected based on an expected image resolution error of the image processing system (e.g., the camera 4 and processor 8). For example, based on the resolution of the camera 4 used to acquire an image, the location of any point (or an edge) can only be determined within some margin of error. Accordingly, during pattern recognition, if a target primitive lies within a predetermined error zone 38 (or corridor) around a model primitive 28, then the target primitive should be considered to lie on the model primitive. Accordingly, the size of the error bars (in terms of the number of adjacent bins 36 into which records are inserted) is selected to ensure that when a target primitive (lying in the error corridor 38) is mapped to the hash table during pattern recognition, the target primitive will cross a bin that contains a record referencing the model primitive and basis.

Steps 216-220 above are repeated for every sample 32. Once records referencing all of the primitives have been inserted into the sample bins (and respective error bar bins), the definition of model data for the respective basis is complete. Steps 210 through 220 above can be repeated for each basis.

Pattern Matching

Figure 4:
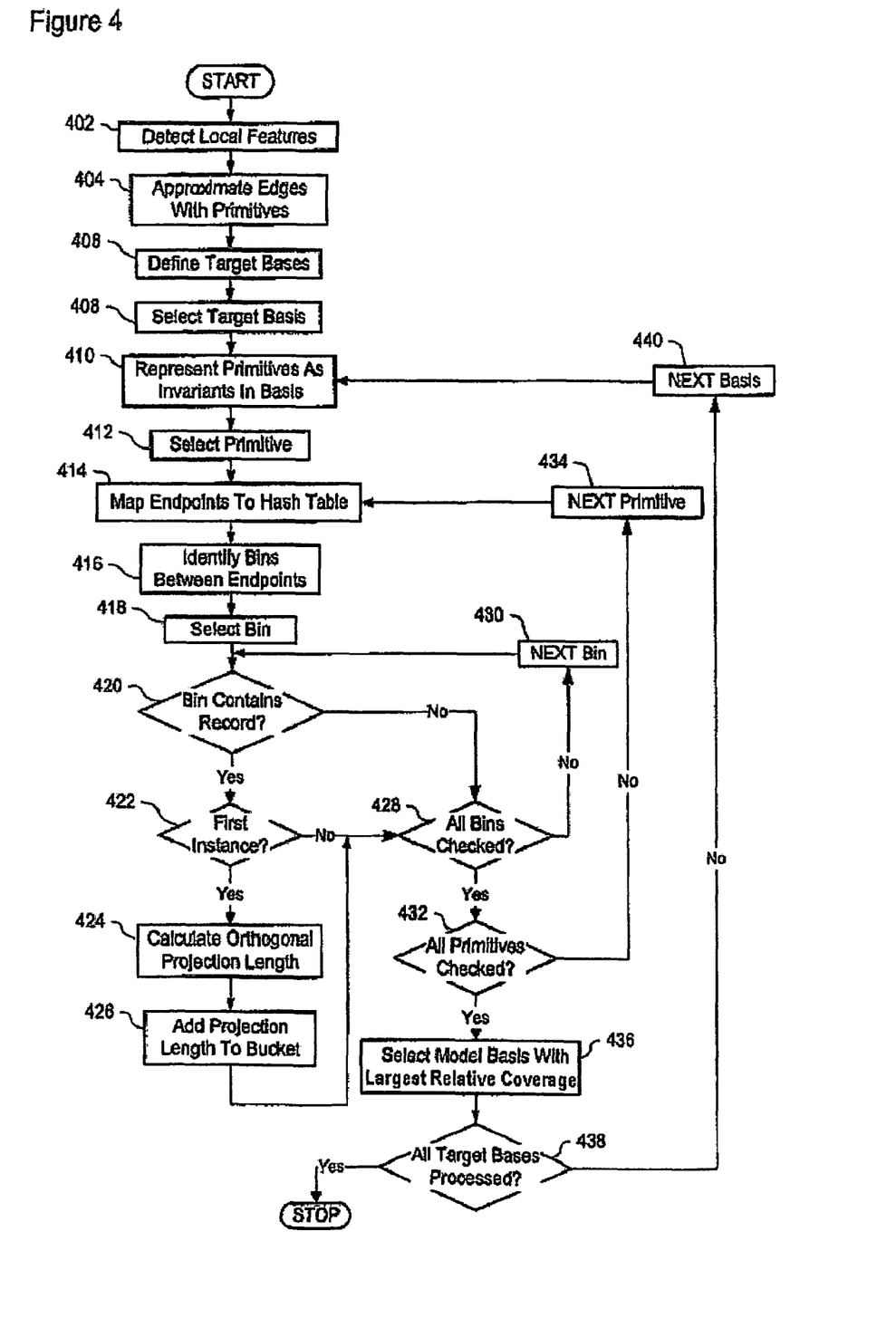
FIG. 4 is a flow chart illustrating principal steps in an exemplary process of pattern matching in accordance with an embodiment of the present invention.

In general, pattern matching involves acquiring and analyzing an acquired target image to find an occurrence of a previously defined model within the target image. FIG. 4 is a flow chart illustrating principle steps in a pattern matching process in accordance with the present invention. As may be seen in FIG. 4, the process of analyzing an acquired image 6 to detect the set of local features (at 402); approximating edges with primitives (at 404); defining bases (at 406 and 408); and then representing the primitives as invariants in a selected basis (at 410) closely follows the corresponding steps 202-210 described above for obtaining model data.

Figure 5A:
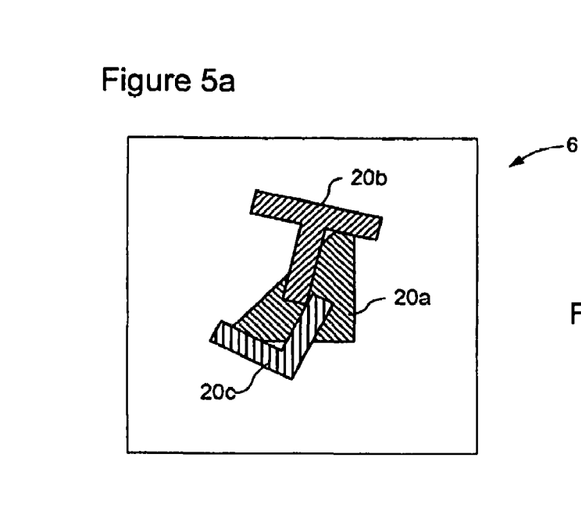
FIGS. 5a-5f respectively illustrate successive steps in the process of FIG. 4.
Figure 5B:
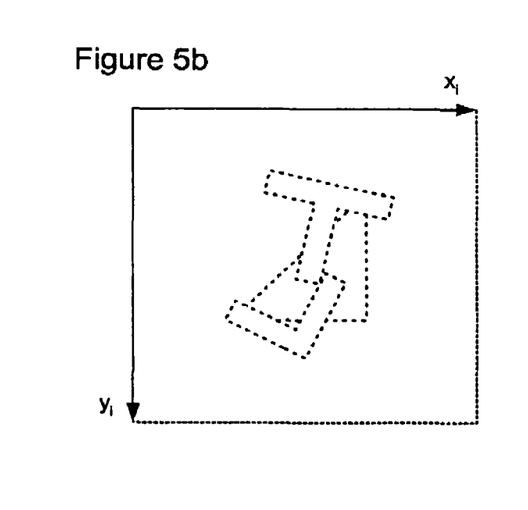
Figure 5C:
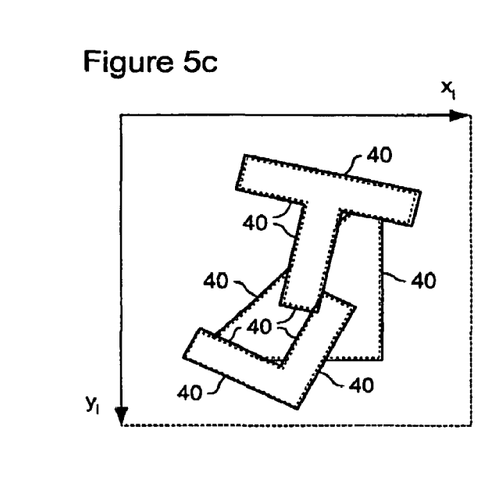

Thus the camera 4 acquires an image 6 of the world space 16, which includes a target object 20a that is to be recognized. FIG. 5a shows an exemplary acquired image containing one target object 20a, and a pair of other objects 20b-c partially occluding the target object 20a. Local features within the acquired target image 6 are detected (step 402 and FIG. 5b). The set of local features are then processed to define target primitives 40 approximating edges within the target image (at 404 and FIG. 5c), using the same method described above for analyzing the acquired archetype image. Similarly, multiple bases are derived (at 406) from the target primitives 40, again using the same methods described above.

Figure 5D:
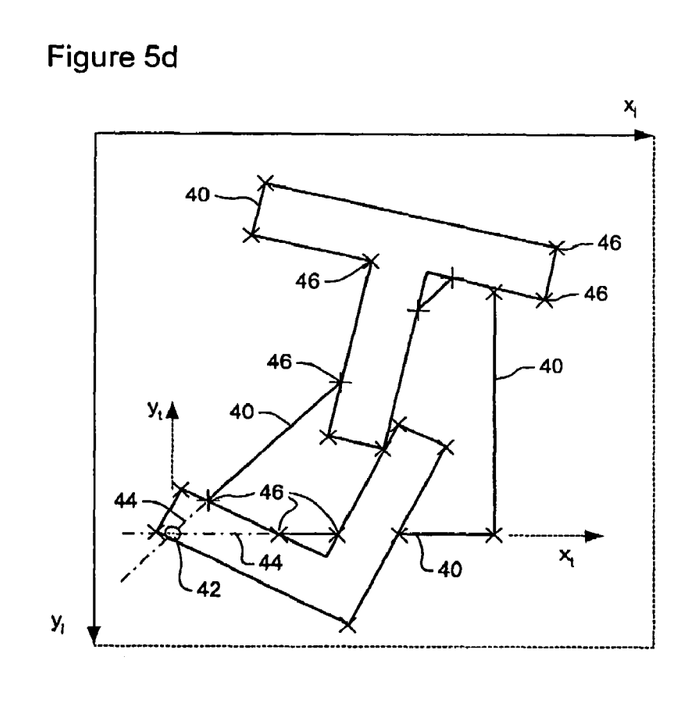
Figure 5E:
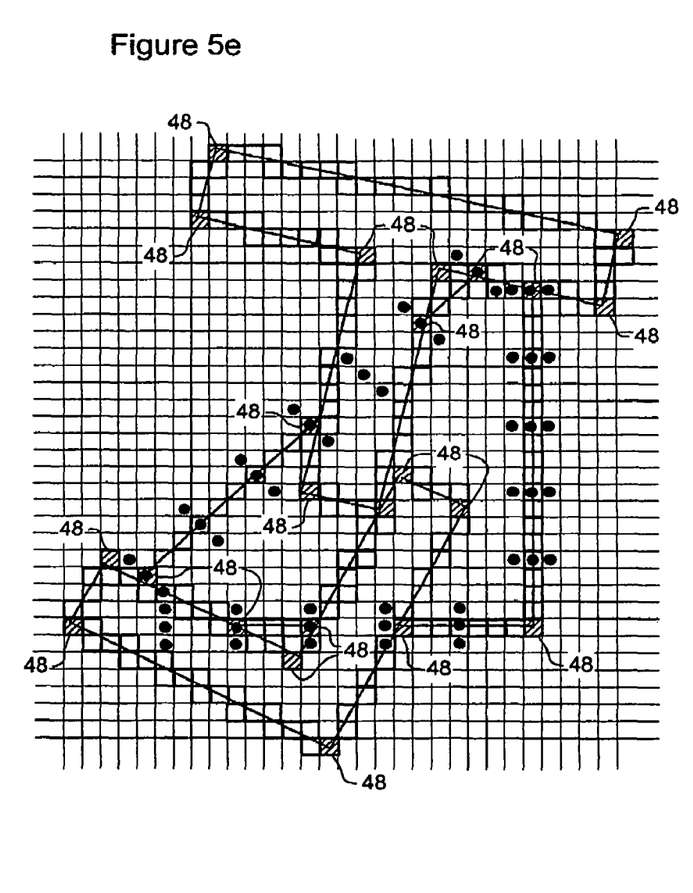

Thus, in the example of FIG. 5d, a target basis is shown in which the origin 42 is calculated as the intersection between respective extrapolations 44 of a pair of target primitives 40, and oriented parallel to one of the two involved primitives 40. Because of the method used to calculate its origin and orientation, this target basis will closely correspond to the basis illustrated in FIG. 3d, in spite of: the presence of the occluding objects 20b-c in the target image; scale changes between archetype and target objects and images; and imprecisions introduced during mapping of the target primitives (e.g., affecting the length of the target primitives 40).

Once the target bases have been derived, one target basis is selected (at 408), and each of the primitives are represented as invariants in that basis (at 410). Then, one of the primitives is selected (at 412), and its end-points 46 (FIG. 5d) identified. These end-points 46 are then mapped (at 414) to associated end-point bins 48 in the hash table.

Once the end-point bins 48 have been identified, each bin of the hash table crossed by an imaginary line extending between the end-points (tracing the shape of the primitive mapped to the hash table) is located (at 416). Any method of representing a line (or curve) as discrete elements (e.g., pixels) may be used for this purpose. For example, a conventional Bresenham method, which is normally used to identify the pixels of a screen that need to be illuminated in order to display a line on a pixelated monitor, may be used. In the present case, however, this method is modified slightly to identify hash table bins instead of pixels.

One of the identified bins is selected (at 418) and examined (at 420) to determine whether it contains a record referencing a model (e.g., in the form of [Basis_ID, Primitive_ID]). As will become apparent below, it is only necessary to perform one comparison between the target primitive and each model primitive referenced in the identified bins. Accordingly, if the selected bin contains a record, then a check is performed (at s 422) to determine whether the record references a basis/primitive for the first time (that is, the referenced basis/primitive was not referenced in any previously selected bin). If the result of this check is "Yes", the length of the orthogonal projection 50 of the target primitive 40 onto the referenced model primitive 28 is calculated (at 424).

Figure 5F:
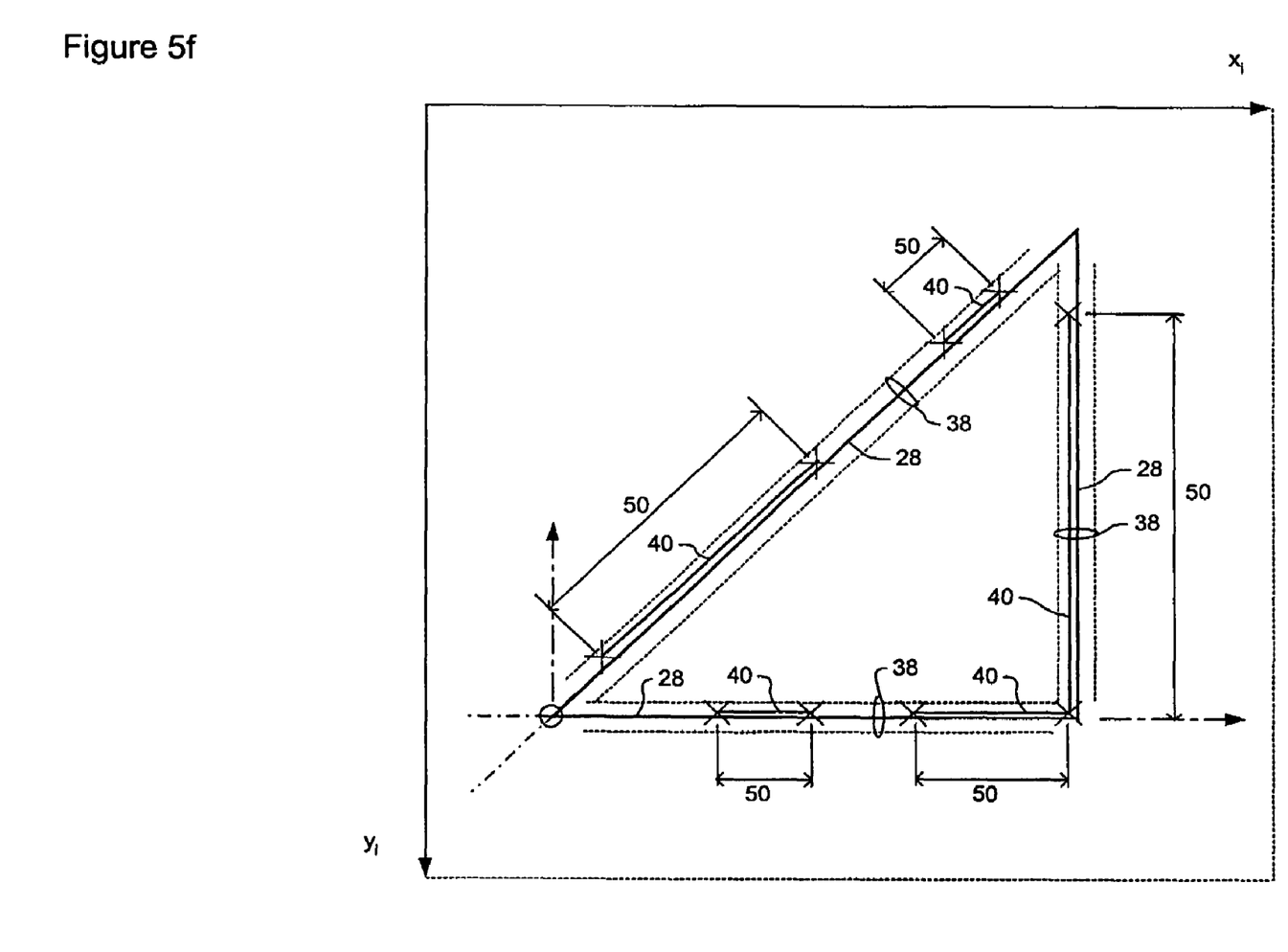
Figure 6:
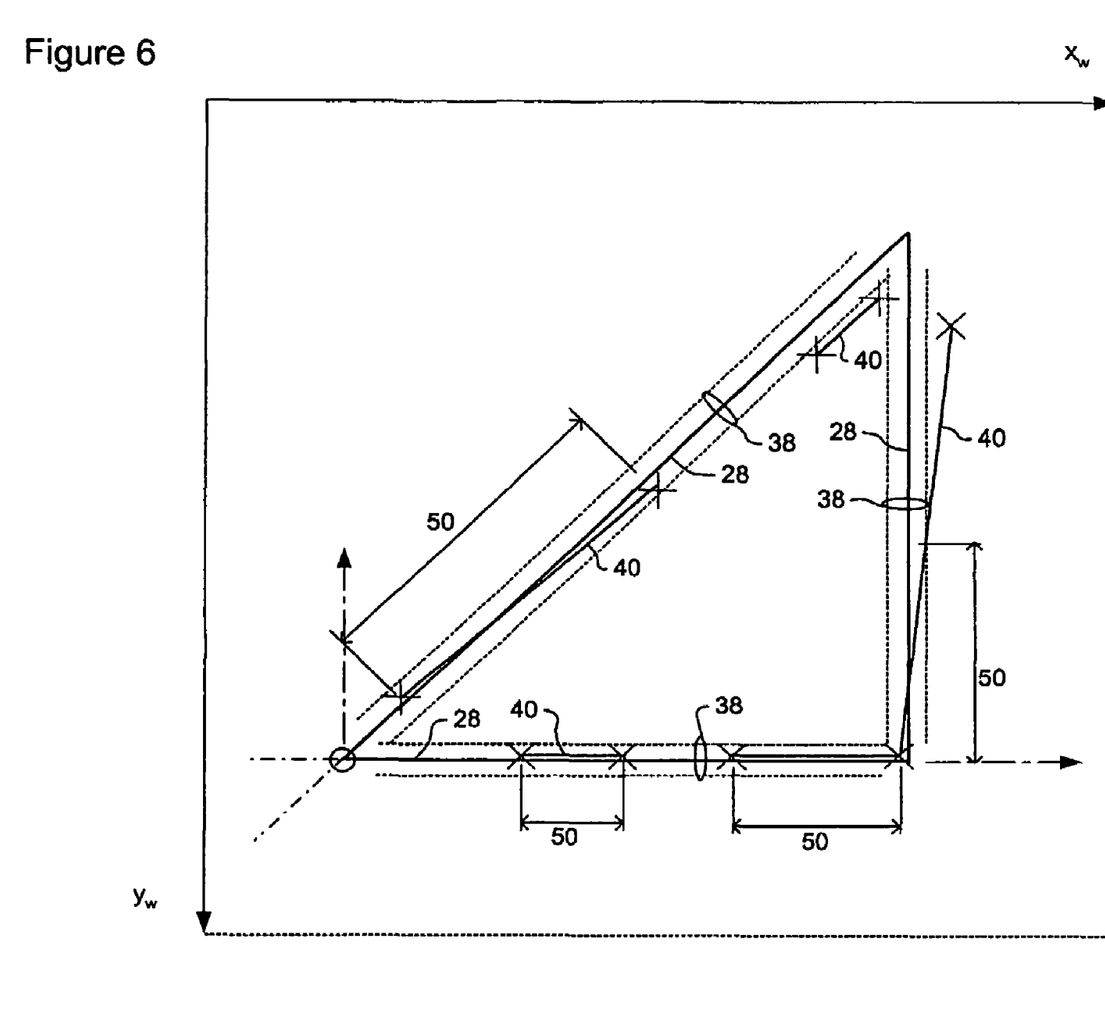
FIG. 6 further illustrates calculation of orthogonal projection length in the embodiment of FIGS. 4 and 5.

As may be seen in FIGS. 5*f* and 6, the orthogonal projection length is the length, measured along the model primitive 28, of that portion of the target primitive 40 lying within the error corridor 38 about the model primitive 28. This orthogonal projection length is then added to a bucket associated with the referenced model basis (at 426). This bucket is used as an accumulator for storing the total length of all of the orthogonal projections calculated in respect of all of the model primitives (for the referenced basis). This total length is directly indicative of the extent to which the target primitives (represented as invariants in the selected target basis) correspond with the model primitives (of the referenced model basis), and may be referred to as the "target coverage" of the model basis.

The total length of the model primitives 28 (which will normally be identical for all of the model bases) can be referred to as the "total coverage". The ratio of the accumulated "target coverage" for any one model basis to the "total coverage" can be referred to as the "relative coverage" of the respective model basis. The "relative coverage" provides a proportional indication of the extent to which the target primitives (of the selected target basis) correspond with the model primitives, and thus provides a scale-independent indication of the quality of match between the target image and the model data associated with the referenced model basis.

As will be appreciated, only one orthogonal projection 50 of a target primitive 40 onto a model primitive 28 should be calculated and added to the bucket at step 426. This is ensured by the above described check at step 422.

Following calculation and addition of the orthogonal projection to the bucket (steps 424 and 426), or, if it its is determined at step 422 that a record referencing the same basis/primitive was found in a previously identified bin, then a check is performed (at 428) to determine whether all of the bins lying between the two end-point bins have been checked. If any bins remain unchecked, then a next bin is selected (at 430), and processing continues from step 420 as described above.

Steps 420-430 are repeated until all of the bins lying between the end point bins 46 have been checked. When all of these bins have been checked, processing of the selected target primitive 40 is complete. A check is then performed at step 432 to determine whether all of the target primitives (represented as invariants in the selected target basis) have been processed. If any target primitives remain unprocessed, then a next primitive is selected (at 434), and processing continues from step 414 as described above.

Steps 414-434 are repeated for each target primitive 40, until all of the target primitives 40 (represented in the selected basis) within the target image have been processed. If the database 10 contains multiple hash tables, then steps 414-434 are also repeated for each hash table. Thus, in effect, each target primitive is processed and matched to every model for which model data is stored in the database 10. This enables instances of multiple different models to be identified within the target image.

When all of the target primitives 40 have been processed, the model basis having the largest relative coverage is then selected (at 436) as a candidate for further analysis and verification of a match between the target image (and basis) and the model. This processing may, for example, involve calculating a transformation between the target basis and the selected model basis to find the location and orientation of an object matching the model in the target image.

Upon completion of the analysis and verification of the candidate model basis at step 436, a check is performed (at 438) to determine whether all of the target bases defined at step 406 have been processed. If any target bases remain unprocessed, then a next target basis is selected at step 440, and processing continues from step 410 as described above. Steps 410-440 are repeated until each target basis has been processed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of pattern matching for recognition of objects within an image using a model defined by a set of one or more model primitives representative of large scale structures of an archetype, the method comprising steps of:
   deriving at least one target primitive representative of a large scale structure of the image:
   for each target primitive:
      identifying any model primitives that at least partially match the target primitive, and
      for each identified model primitive, calculating a geometric figure of merit indicative of a degree of geometric correspondence between the target primitive and the model primitive; and
   accumulating the geometric figures of merit;
   wherein the step of deriving at least one target primitive comprises steps of:
      detecting geometric features within the image;
      analyzing the detected geometric features to find large scale structures of the image;
      approximating each large scale structure with at least one respective primitive;
      deriving a basis from at least one of the primitives; and
      representing each of the primitives as invariants in the derived basis;
   wherein the step of deriving a basis comprises the steps of calculating an origin of a respective local coordinate system and calculating an orientation of the respective local coordinate system;
   wherein the step of deriving a basis further comprises the steps of deriving a plurality of bases and selecting at least one of the plurality of derived bases; and
   wherein the step of selecting at least one of the plurality of derived bases comprises any one or more of:
      selecting bases derived using relatively large primitives; selecting at most two bases derived using any one primitive; selecting bases having respective origins distributed substantially evenly across the image; and selecting bases in respect of which the orientation of the respective coordinate system is parallel to at least one primitive used in the derivation of the respective basis.

2. A method of pattern matching for recognition of objects within an image using a model defined by a set of one or more model primitives representative of large scale structures of an archetype, the method comprising steps of:
deriving at least one target primitive representative of a large scale structure of the image;
for each target primitive:
identifying any model primitives that at least partially match the target primitive, and
for each identified model primitive, calculating a geometric figure of merit indicative of a degree of geometric correspondence between the target primitive and the model primitive; and
accumulating the geometric figures of merit;
wherein the step of deriving at least one target primitive comprises steps of:
detecting geometric features within the image;
analyzing the detected geometric features to find large scale structures of the image;
approximating each large scale structure with at least one respective primitive:
deriving a basis from at least one of the primitives; and
representing each of the primitives as invariants in the derived basis:
wherein the step of deriving a basis comprises the steps of calculating an origin of a respective local coordinate system and calculating an orientation of the respective local coordinate system; and
wherein the step of calculating the orientation of the respective local coordinate system comprises the steps of selecting one of the primitives used to calculate the origin, and setting the orientation of the coordinate system based on an orientation of the selected primitive.

3. A method as claimed in claim 2, wherein the step of calculating the orientation of the respective local coordinate system comprises a step of calculating an average orientation of the primitives used to calculate the origin.

4. A method as claimed in claim 3, wherein the orientation of each primitive is weighted by a length of the respective primitive.

5. A method of pattern matching for recognition of objects within an image using a model defined by a set of one or more model primitives representative of large scale structures of an archetype, the method comprising steps of:
deriving at least one model primitive representative of large scale structures of an archetype;
sampling each model primitive at two or more respective sample locations;
mapping each sample location to a respective sample bin of a hash table;
inserting a reference to the respective model primitive in the sample bin;
deriving at least one target primitive representative of a large scale structure of the image:
for each target primitive:
identifying any model primitives that at least partially match the target primitive, and
for each identified model primitive, calculating a geometric figure of merit indicative of a degree of geometric correspondence between the target primitive and the model primitive; and
accumulating the geometric figures of merit.

6. A method as claimed in claim 5, wherein each model primitive is sampled with a granularity selected on the basis of desired recognition accuracy and speed.

7. A method of pattern matching for recognition of objects within an image using a model defined by a set of one or more model primitives representative of large scale structures of an archetype, the method comprising steps of:
deriving at least one target primitive representative of a large scale structure of the image;
for each target primitive:
identifying any model primitives that at least partially match the target primitive, and
for each identified model primitive, calculating a geometric figure of merit indicative of a degree of geometric correspondence between the target primitive and the model primitive; and
accumulating the geometric figures of merit;
wherein each model primitive is associated with a respective model basis, and wherein the step of accumulating the geometric figures of merit comprises calculating a sum of the geometric figures of merit calculated for model primitives associated with the respective model basis; and
further comprising the steps of:
calculating a ratio indicative of a proportionality between the accumulated geometric figures of merit and an ideal accumulation of the geometric figures of merit; and
selecting, as a candidate basis, the model basis having the highest ratio.

* * * * *